G. M. SCOFIELD.
REINFORCED CONCRETE CONDUIT.
APPLICATION FILED DEC. 10, 1919.
1,346,687.
Patented July 13, 1920.
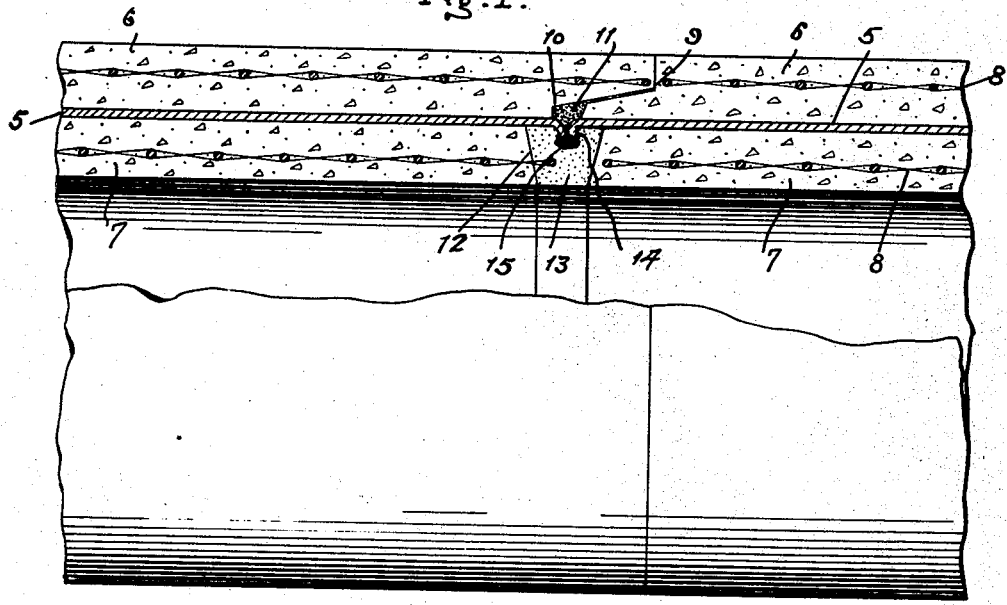
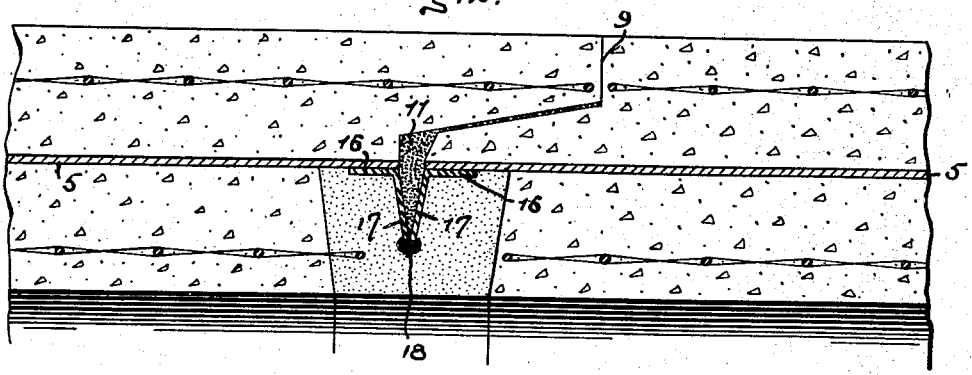
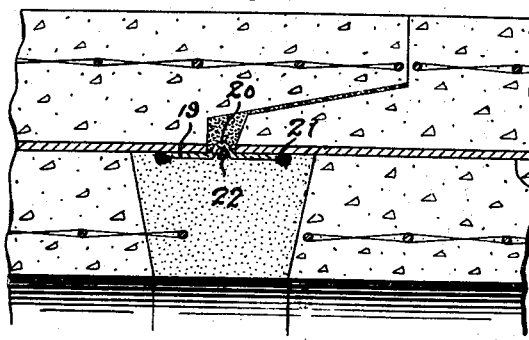
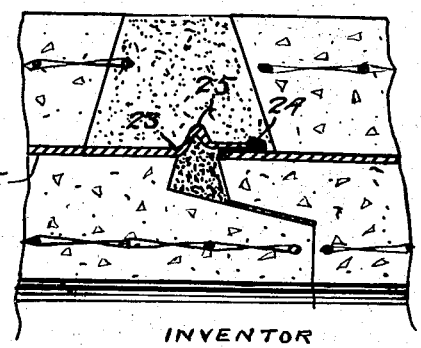
INVENTOR
GLENN M. SCOFIELD
BY
ATTORNEYS

UNITED STATES PATENT OFFICE.

GLENN MASON SCOFIELD, OF SAN DIEGO, CALIFORNIA, ASSIGNOR TO UNITED CONCRETE PIPE COMPANY, OF NEW YORK, N. Y., A CORPORATION OF DELAWARE.

REINFORCED-CONCRETE CONDUIT.

1,346,687.       Specification of Letters Patent.    Patented July 13, 1920.

Application filed December 10, 1919. Serial No. 343,727.

*To all whom it may concern:*

Be it known that I, GLENN MASON SCOFIELD, a citizen of the United States of America, residing at San Diego, in the county of San Diego and State of California, have invented certain new and useful Improvements in Reinforced-Concrete Conduits, of which the following is a specification.

My invention relates to reinforced concrete conduits, and particularly to the joint between abutting sections of the conduit, the object of my invention being to provide a conduit of such construction that leakage cannot occur at joints due to expansion and contraction incident to temperature changes.

In the accompanying drawings—

Figure 1 is a side elevation partially in section through a conduit in which my invention is embodied in one form; and Figs. 2, 3 and 4 are similar views showing various modifications of construction.

In reinforced concrete conduit lines of the unit section type the joint between adjacent sections is apt to open, unless adequate means are provided for taking up variations in the length of sections incident to expansion and contraction. The present invention provides a conduit in which the sections of metal pipe which are embedded in the concrete of the conduit are rendered practically continuous by welding together at their joints, while at the same time means are provided at these joints to take up variations in length of the sections incident to temperature change.

In the form shown in Fig. 1 each conduit section comprises a metal pipe 5 embedded in concrete 6, 7, which is strengthened by mesh reinforce 8 both inside and outside the pipe 5. Between the abutting ends of the concrete shell elements 6 a bell and spigot joint 9 is provided. Preferably an annular chamber 10 is formed at the inner margin of the joint 9 to receive a packing 11 of some plastic material which will retain its plasticity under usual temperature conditions, and so will yield on expansion or contraction at the joint. The lining 7 of the conduit is spaced from the ends of the pipe sections 5 to afford an undercut, annular channel 12, through which access may be had to the joint area of the pipe ends. After the joint has been fully made, this channel 12 is filled with mortar 13 flush with the inner face of the conduit.

The expansion joint between the metal pipe sections 5 is formed by offsetting the pipe ends to form annular flanges 14, which project inward into the channel 12 and closely approach each other at their inner margins. After the conduit sections have been abutted to close the bell and spigot joint 9, the metal pipe flanges 14 are welded together at 15 by an operator working from the interior of the pipe. The welding operation may be accomplished in any desired manner, as by the use of an electric welding pencil, an acetylene torch, or otherwise. However formed, the welded union between the flanges 14 not only forms an expansion joint, but also renders the adjacent pipe sections 5 continuous. On contraction of the conduit at low temperature, the crimp formed by the flanges 14 tends to flatten out, the plastic material 11 offering no substantial opposition to this movement.

In Fig. 2 the same thought is embodied in a modified construction, in which the ends of the pipes 5, instead of being offset, have secured thereto rings 16 with inwardly angled flanges 17. In the abutted position of the conduit sections the inner margins of these flanges 17 approach each other and are welded together at 18. The rings may be secured to the pipes 5 in any suitable way, preferably by welding, so as to insure a liquid- and gas-tight joint therewith. Obviously the flanges 17 afford a crimp in the pipe line which straightens out on contraction of the latter, while the plastic filling material 11 confined in the chamber 10 permits this action in precisely the same way as in the construction first described.

In Fig. 3 a further modification is illustrated, in which a ring 19 with crimp 20 therein is welded to one of the pipes 5 before the concrete is cast thereon. After the conduit sections are abutted, the opposite side of the ring overlaps and is welded at 21 to the pipe 5 of the adjacent conduit section. In this construction it is advisable to fill the crimp 20 with plastic material 22, which will yield when the crimp 20 flattens out.

In Fig. 4 one of the pipe sections 5 has its end slightly expanded at 23 to sleeve over the end of the pipe 5 of the adjacent conduit section to which it is welded at 24 in the finished joint. The flange 23 is also provided with an expansion crimp 25 for the purpose hereinbefore mentioned. In this figure I have also shown the bell and spigot joint reversed—that is to say, formed in the concrete lining of the conduit section rather than in the shell, while the latter is recessed to afford an annular channel through which access may be had to the joint from the exterior of the pipe for welding the flange, or for repairs while the conduit is in service.

It will be understood, of course, that the pipes 5 need not be carried throughout the length of the conduit sections, it being sufficient that they are embedded therein and enter the joint area, and I use the word "pipe" in a sense broad enough to cover this construction. I prefer, however, to have them continuous from end to end in the conduit sections, since this affords a metal pipe which, in the finished, welded-joint conduit, is continuous from end to end of the line, and renders the conduit leak-proof even against gas or liquid passing therethrough under pressure. Similarly the joint shown in Figs. 1 to 3 may be reversed and faced outward instead of inward, and the joint made from the exterior of the pipe and then filled in, as in Fig. 4, or the latter may be reversed and faced inward.

The construction of the joint may be variously further modified without departing from what I claim as my invention.

I claim—

1. A reinforced concrete conduit comprising metal pipe lengths embedded in concrete sections, and welded expansion joints between adjacent pipe lengths to render the latter continuous and free from leakage at the joint between adjacent conduit sections.

2. A reinforced concrete conduit comprising metal pipe lengths embedded in concrete, an offset expansion element at the joint between adjacent pipe lengths, and a welded union between said lengths at the joint to afford a seal.

3. A reinforced concrete pipe line comprising metal pipe lengths, welded joints between the same to afford an uninterupted or continuous metal pipe line, an expansion element at certain of said joints to take up variations in the length of the pipe, in combination with concrete incasing said metal pipe line, substantially as described.

4. A reinforced concrete conduit comprising metal pipe lengths embedded in concrete, a joint between the abutting ends of the concrete on one face of the pipe, and an annular channel in the concrete on the other side of the pipe to afford access to the abutting pipe ends, an expansion crimp at the pipe joint, and a weld union between adjacent pipe lengths at the joint to seal the latter.

5. A reinforced concrete conduit comprising metal pipe lengths embedded in concrete, a welded expansion joint between adjacent pipe lengths, and plastic material at the expansion joint to permit the latter to function.

6. A reinforced concrete conduit comprising metal pipe lengths embedded in concrete, a joint between the abutting ends of the concrete on one face of the pipe, and an annular channel in the concrete on the opposite face of the pipe at the joint, a welded expansion joint between the abutting pipe ends, plastic material at said expansion joint to permit the same to function, and filling material in said channel.

7. A reinforced concrete conduit comprising metal pipe lengths embedded in concrete, a joint between the abutting ends of the concrete on one face of the pipe, said ends being recessed to afford an annular chamber, a welded expansion joint between the abutting pipe ends, an annular channel in the concrete on the opposite face of the pipe and opening to said welded joint, plastic material in said annular chamber, and filling material in said annular channel.

In testimony whereof I have signed my name to this specification.

GLENN MASON SCOFIELD.